United States Patent
Mizoue et al.

[11] Patent Number: 6,008,481
[45] Date of Patent: Dec. 28, 1999

[54] METHOD AND APPARATUS FOR DECIDING HEATED STATE OF METAL BILLET

[75] Inventors: Kiyonobu Mizoue; Hisao Hirono; Takashi Idegomori; Shigenori Kimijima, all of Utsunomiya; Osami Ito, Tochigi-ken; Kenji Ohwada; Hiroshi Ishii, both of Utsunomiya, all of Japan

[73] Assignee: Honda Giken Kogyo Kabushiki Kaisha, Tokyo, Japan

[21] Appl. No.: 09/115,262

[22] Filed: Jul. 14, 1998

[30] Foreign Application Priority Data

Jul. 15, 1997 [JP] Japan ................................. 9-190029
Jul. 16, 1997 [JP] Japan ................................. 9-191464
Jul. 30, 1997 [JP] Japan ................................. 9-204225

[51] Int. Cl.$^6$ ................................................ H05B 6/15
[52] U.S. Cl. ............................ 219/646; 72/422; 148/688
[58] Field of Search ............................ 219/672, 646, 219/656, 676, 654, 632, 674; 72/422, 342, 361, 364, 13; 148/688

[56] References Cited

U.S. PATENT DOCUMENTS

| | | |
|---|---|---|
| 4,543,058 | 9/1985 | Petersen . |
| 4,569,218 | 2/1986 | Baker et al. . |
| 4,712,413 | 12/1987 | Koch ........................................ 72/361 |
| 5,027,634 | 7/1991 | Visser et al. ............................. 72/270 |
| 5,306,365 | 4/1994 | Reighard ................................. 148/688 |
| 5,448,039 | 9/1995 | Okayama et al. ...................... 219/646 |

FOREIGN PATENT DOCUMENTS

B2 2-7748  2/1990  Japan .
682169  3/1994  Japan .

*Primary Examiner*—Mark Paschall
*Assistant Examiner*—Jeffrey Pwu
*Attorney, Agent, or Firm*—Birch, Stewart, Kolasch & Birch, LLP

[57] ABSTRACT

A heated state-deciding apparatus and a thermocouple provided for a transport robot for detecting the temperature of a billet being transported by the transport robot, and a deciding member for deciding whether or not the billet is heated to be in a predetermined solid phase state on the basis of the detected temperature. Accordingly, it is possible to efficiently and accurately decide whether or not the solidus rate of the metal billet is good or bad, and it is possible to improve the productivity.

26 Claims, 15 Drawing Sheets

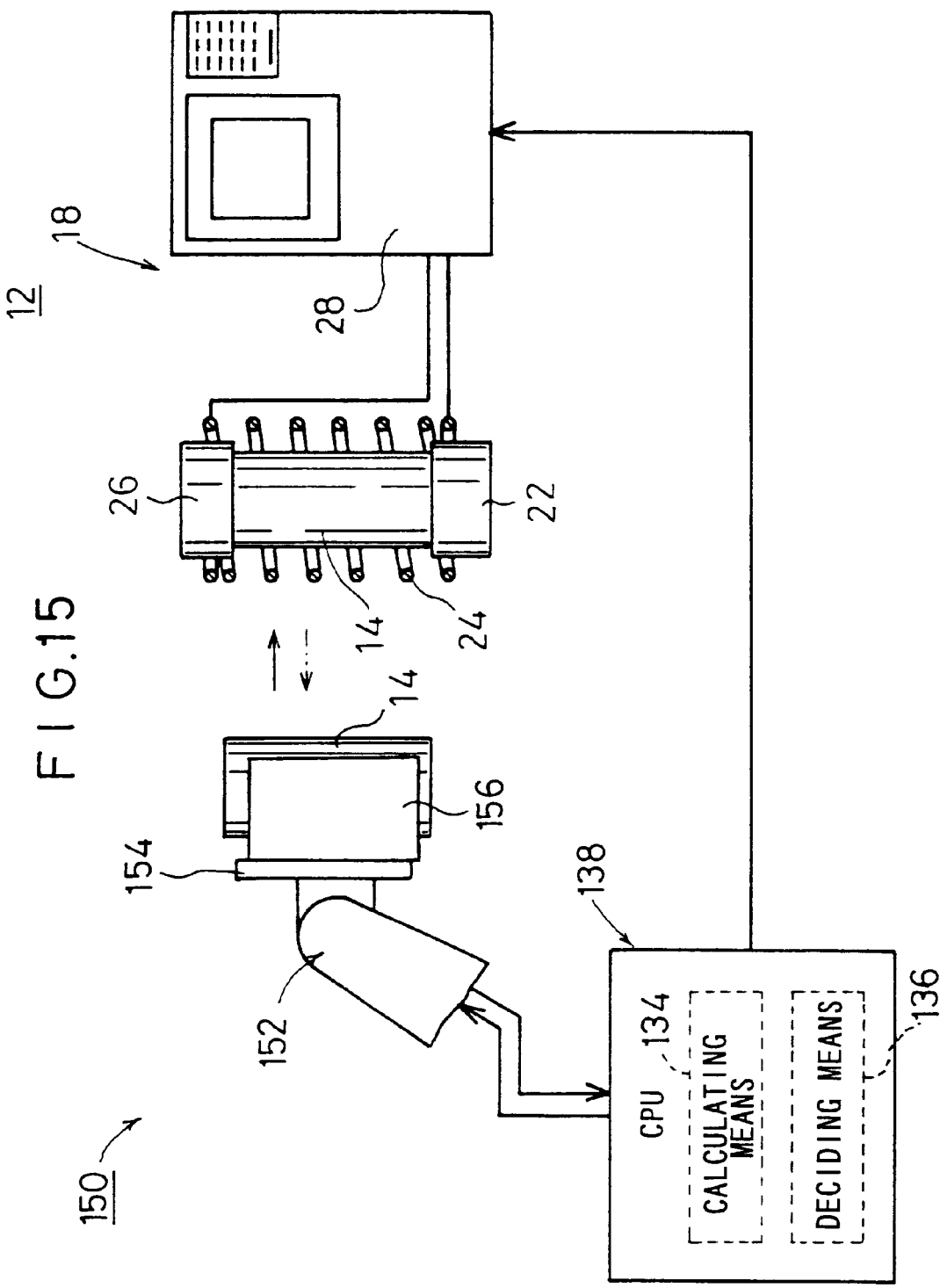

METHOD AND APPARATUS FOR DECIDING HEATED STATE OF METAL BILLET

BACKGROUND OF THE INVENTION

1. Field of the Invention

The present invention relates to a method and an apparatus for deciding a heated state of a billet made of metal, for detecting the heated state of the metal billet during the transport of the heated metal billet to a forming machine.

2. Description of the Related Art

A method is generally known, in which a metal preform (hereinafter referred to as "metal billet") is heated to be in a semisolidified state by using a heating apparatus, and then the metal billet is subjected to forming operation by using a forming apparatus while maintaining the metal billet in a semisolidified state to form a predetermined formed product of metal.

The heating apparatus to be used for such a method comprises a plurality of induction heaters corresponding to the billet, the induction heaters being disposed over a placing apparatus provided with a series of insulated pedestals arranged around a rotatable table, as disclosed, for example, in Japanese Patent Publication No. 2-7748. The induction heater is constructed such that when the billet is guided to arrive at the position of the induction heater in accordance with the rotation of the table, the billet, which stands without being supported at its side surface, is allowed to have an enthalpy which is successively increased to a level at which the billet is partially in a semisolid state.

The billet, which is taken out of the heating apparatus, is subjected to predetermined forming operation by using the forming apparatus. Therefore, in order to obtain a high quality formed product by using the forming apparatus, it is necessary to maintain the billet to be in a predetermined heated state, i.e., to have a predetermined solidus rate. Accordingly, a variety of operations have been hitherto carried out in order to detect whether or not the billet after completion of the heating is maintained to have a predetermined solidus rate.

Those hitherto adopted include, for example, a method in which a billet after completion of the heating is arbitrarily extracted or sampled, and the billet is cut with a knife or the like to judge whether the heated state is good or bad (hereinafter referred to as "first method"), a method in which a thermocouple is previously inserted into a billet before mass-production, and the heating condition is determined on the basis of a result of temperature measurement, obtained by using the thermocouple (hereinafter referred to as "second method"), and a method in which the heated state of a billet is judged from inclination and deformation of the billet by means of visual observation performed by an operator (hereinafter referred to as "third method").

However, in the case of the first method described above, it is impossible to perform on-line feedback control for external factors such as atmospheric temperature and water temperature, because the billet is subjected to sampling inspection. Therefore, it is difficult to stably maintain the product quality. In the case of the second method described above, it is impossible to quantitatively manage the condition during mass-production, because the condition is previously determined before the mass-production. In the case of the third method described above, the production line is sometimes stopped in order to confirm the inclination and deformation of the billet. Therefore, a problem is pointed out that the productivity is extremely deteriorated.

SUMMARY OF THE INVENTION

A principal object of the present invention is to provide a method and an apparatus for deciding a heated state of a metal billet, which make it possible to easily and reliably detect the heated state of the billet, stably maintain the product quality, and improve the productivity.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 schematically illustrates an arrangement of a heating line to be incorporated with an apparatus for deciding the heated state of the metal billet according to a tenth embodiment of the present invention.

DESCRIPTION OF THE PREFERRED EMBODIMENTS

Figure 1:
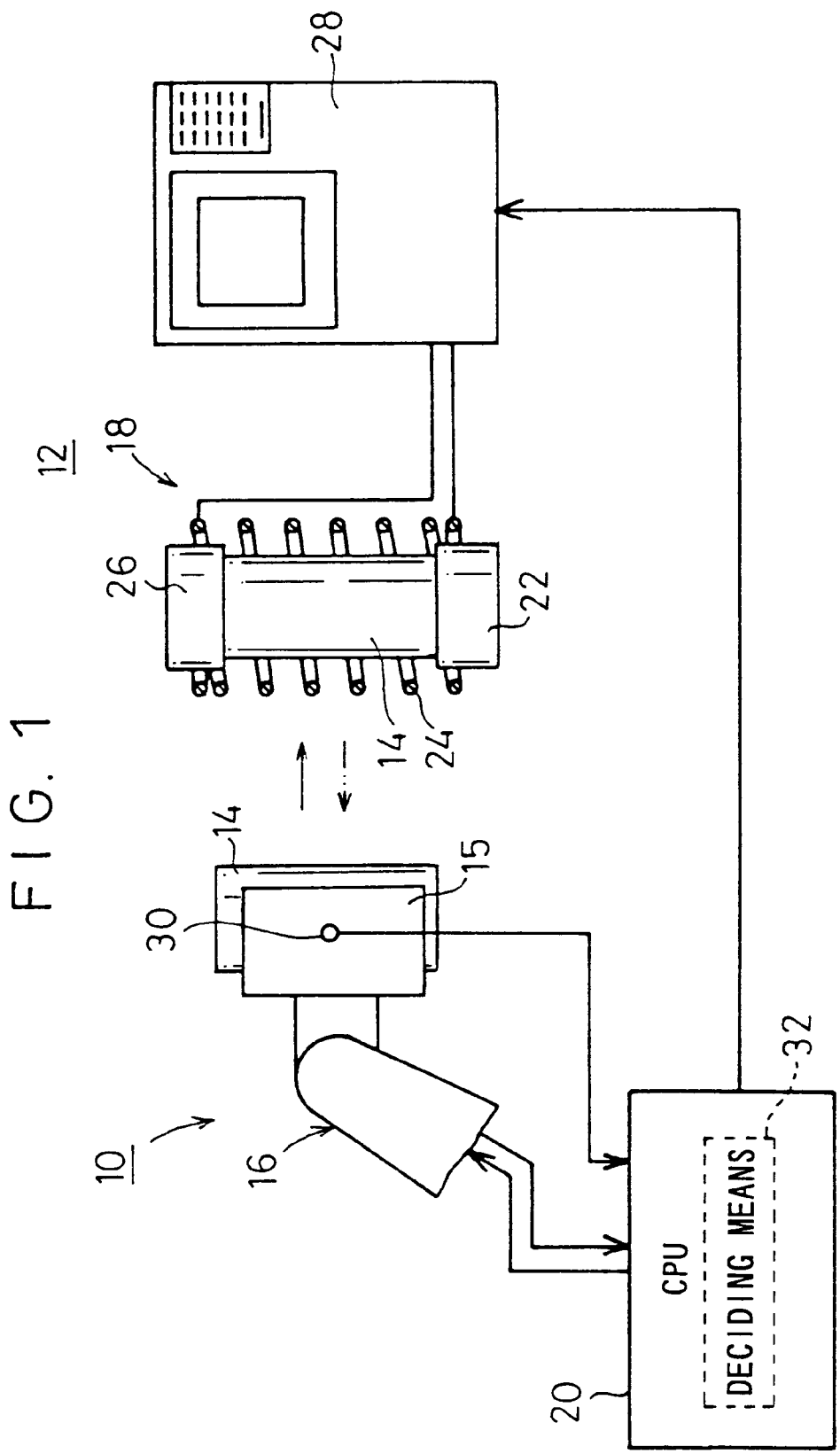
FIG. 1 schematically illustrates an arrangement of a heating line to be incorporated with an apparatus for deciding the heated state of the metal billet according to a first embodiment of the present invention.

FIG. 1 schematically illustrates an arrangement of a heating line 12 into which an apparatus 10 for deciding the heated state of the metal billet according to a first embodiment of the present invention is incorporated.

The heating line 12 comprises a transport robot (transport means) 16 for holding and transporting, with a pair of insulating members (for example, those made of ceramic) 15 as grip members, a billet 14 made of metal, for example, made of aluminum; an induction heating unit (heating means) 18 for induction-heating the billet 14 imported and exported by the aid of the transport robot 16; and CPU 20 for controlling operation of the transport robot 16 and the induction heating unit 18.

The induction heating unit 18 comprises a pedestal 22 for placing the billet 14 in its standing posture, an induction heating coil 24 which surrounds the billet 14 on the pedestal 22 and which is movable upwardly and downwardly, and a holding member 26 capable of pressing and holding the billet 14 at its upper end. The coil 24 is connected to a controller 28 which contains a power source. The controller 28 is capable of supplying, to the coil 24, a current ranging from a low frequency to a high frequency.

The heated state-deciding apparatus 10 comprises a thermocouple (temperature-measuring means) 30 provided through one of the insulating members 15 of the transport robot 16, for on-line detecting the temperature of the billet 14 during the transport by the transport robot 16, and a deciding means 32 for deciding whether or not the billet 14 is heated to be in a predetermined solid phase state on the basis of the temperature detected by the thermocouple 30.

Figure 2:
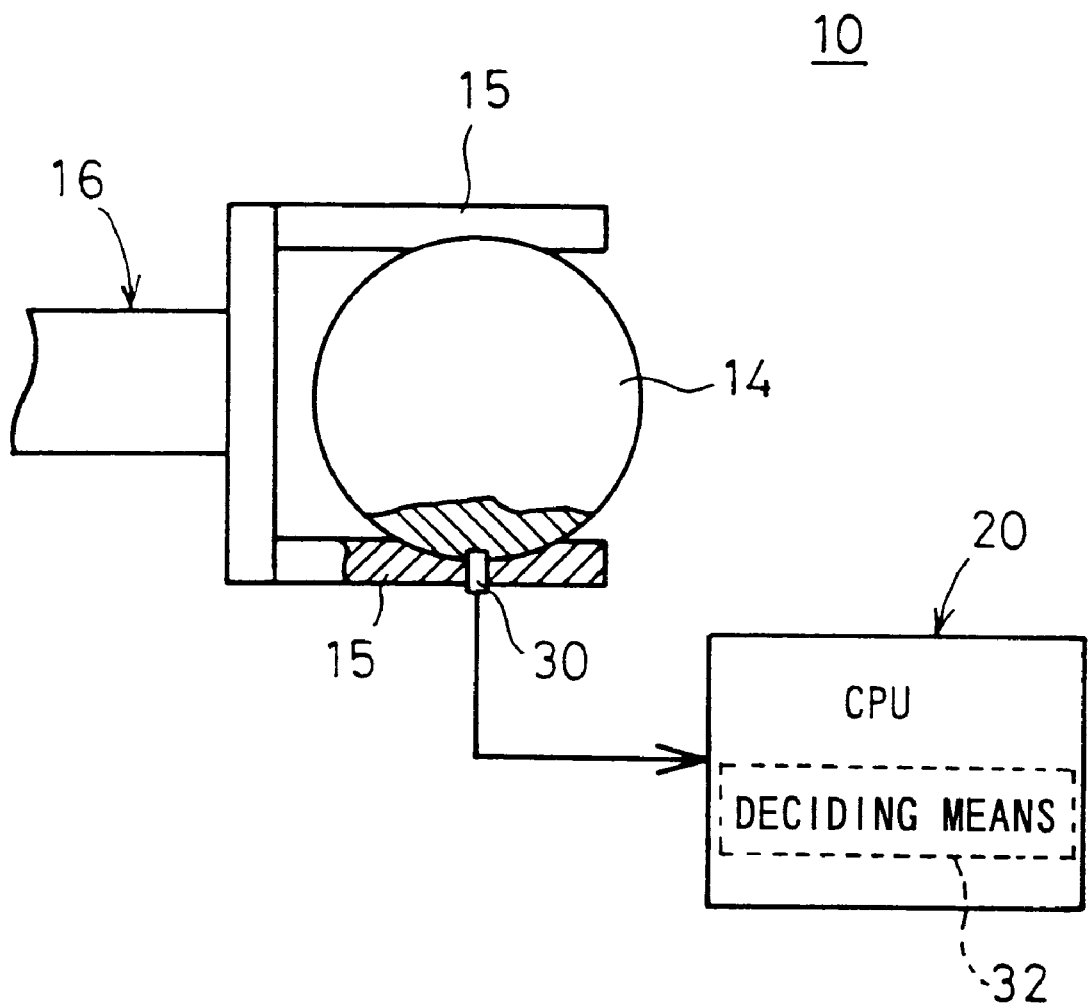
FIG. 2 shows a schematic plan view illustrating the apparatus for deciding the heated state according to the first embodiment.

As shown in FIGS. 1 and 2, the thermocouple 30 is embedded in one of the insulating members 15, and it is arranged with its forward end protruding toward the billet 14. The thermocouple 30 detects the temperature of the billet 14, and it sends the temperature data to CPU 20. CPU 20 functionally comprises a deciding means 32 which is used to compare the previously established temperature of optimum heating with the detected temperature so that it is judged whether or not the solidus state of the billet 14 is good or bad.

Figure 3:
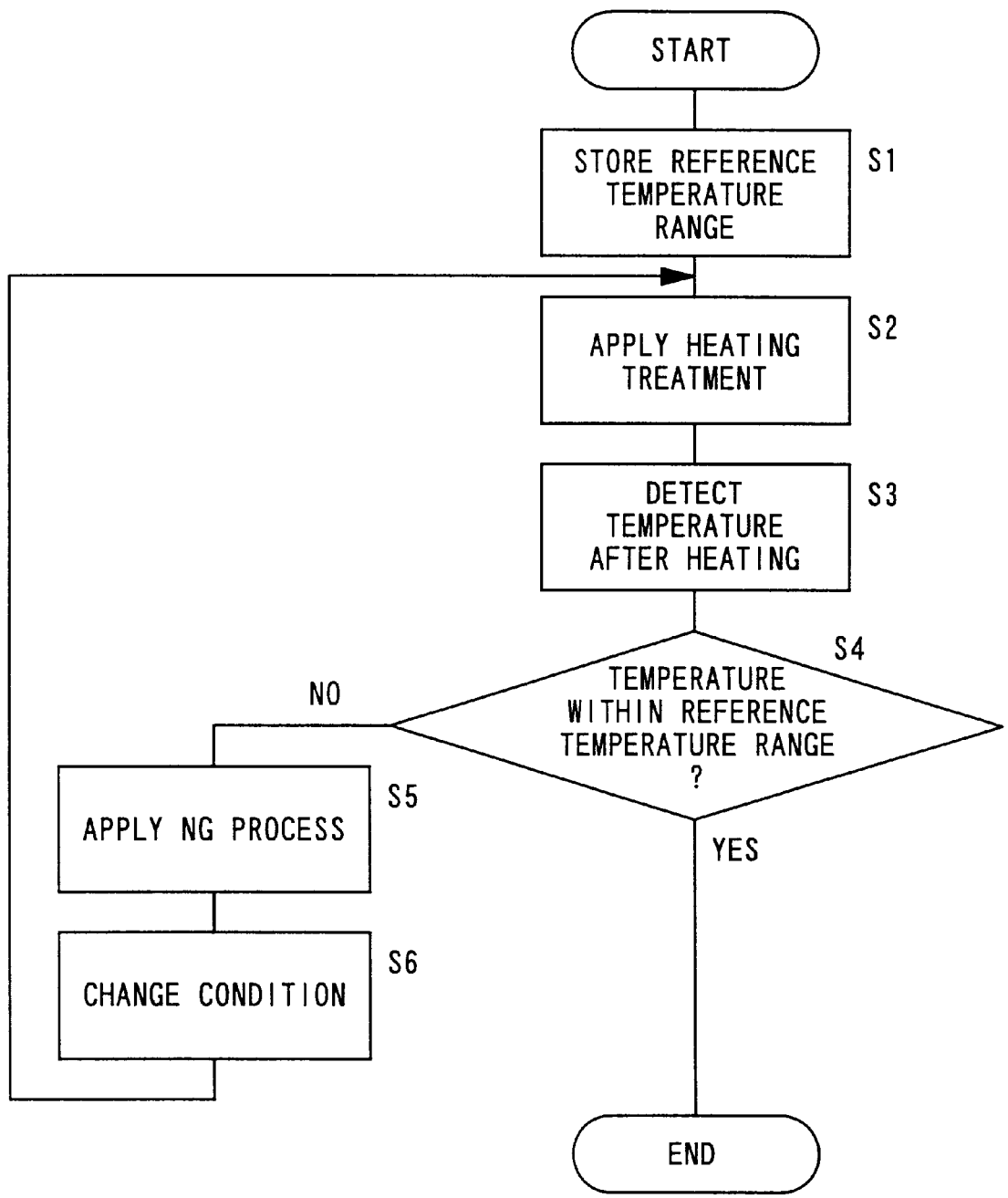
FIG. 3 shows a flow chart illustrating a method for deciding the heated state of the metal billet according to the first embodiment of the present invention.

The operation of the apparatus 10 for deciding the heated state according to the first embodiment constructed as described above will be explained below on the basis of a flow chart shown in FIG. 3 in relation to the heating line 12.

At first, CPU 20 stores the reference temperature range for deciding whether the solidus rate of the billet 14 is good or bad on the basis of the temperature to be obtained when the optimum heating is performed, previously measured by using the billet 14 (step S1). Accordingly, the transport robot 16 is operated by the aid of CPU 20. The transport robot 16 places the billet 14 on the pedestal 22 of the induction heating unit 18.

The induction heating unit 18 is operated as follows. That is, the coil 24 and the holding member 26 are lowered, and the billet 14 on the pedestal 22 is surrounded by the coil 24. The holding member 26 presses the billet 14 toward the pedestal 22 to hold it. In this state, the controller 28 is operated to allow the current to flow through the coil 24. Thus, the billet 14 is subjected to an induction heating treatment (step S2).

After completion of the induction heating treatment for the billet 14 effected by the induction heating unit 18, the coil 24 and the holding member 26 are lifted upwardly. The transport robot 16 holds the billet 14 after the heating, and it transports the billet 14 to an unillustrated forming apparatus (forming machine). During this process, as shown in FIG. 2, when the pair of insulating members 15, which construct the transport robot 16, hold the billet 14 after the heating, the forward end of the thermocouple 30 provided through one of the insulating members 15 is inserted by a predetermined amount into the billet 14. Accordingly, the temperature of the billet 14 after the heating is detected by the aid of the thermocouple 30, and the temperature data is sent to CPU 20 (step S3).

The deciding means 32 of CPU 20 judges, in a step S4, whether or not the temperature of the billet 14 detected by the thermocouple 30 is within the previously stored reference temperature range. If it is judged that the detected temperature is within the reference temperature range (YES in the step S4), it is judged that the billet 14 is heated to have the predetermined solidus rate. The billet 14 is sent to the unillustrated forming apparatus.

On the other hand, if it is judged that the detected temperature is without the reference temperature range (NO in the step S4), the routine proceeds to a step S5 to apply an NG process. Specifically, the billet 14 is discarded, or the billet 14 is subjected to the heating treatment again effected by the induction heating unit 18. Further, the routine proceeds to a step S6 to change the condition of the induction heating effected by the controller 28. Specifically, the control condition of the controller 28 including, for example, the output voltage and the heating time is corrected.

In the first embodiment, the thermocouple 30 as the temperature-measuring means is installed to one of the insulating members 15 which constructs the transport robot 16. When the billet 14 after the induction heating treatment is held and transported to the unillustrated forming apparatus, the temperature of the billet 14 is directly detected on-line by the aid of the thermocouple 30. The temperature of the billet 14 detected by the thermocouple 30 is compared with the reference temperature range, and thus it is decided whether the solidus ratio of the billet 14 is good or bad.

Therefore, it is possible to accurately and easily detect whether the solidus ratio is good or bad in real time for each of the billets 14. The forming operation, which is performed by using the billet 14, is carried out to give a high quality. Thus, an effect is obtained in that the dispersion of product quality can be effectively suppressed. Further, it is unnecessary to stop the operation of the heating line 12, it is possible to efficiently feed the billet 14 having the desired solidus ratio, and it is possible to greatly improve the productivity.

If the billet 14 after the heating does not have the predetermined solidus rate, CPU 20 can change the heating condition of the controller 28 on-line, making it possible to stabilize the product quality. During this procedure, if the heated temperature of the billet 14, which is successively detected by the thermocouple 30, has a tendency to decrease, or if the heated temperature of the billet 14 has a tendency to increase, then CPU 20 can be used to correct, for example, the output voltage and the heating time of the controller 28. Accordingly, the billet 14 is allowed to approach the temperature of optimum heating, making it possible to efficiently and stably obtain the billet 14 having the predetermined solidus rate.

Figure 4:
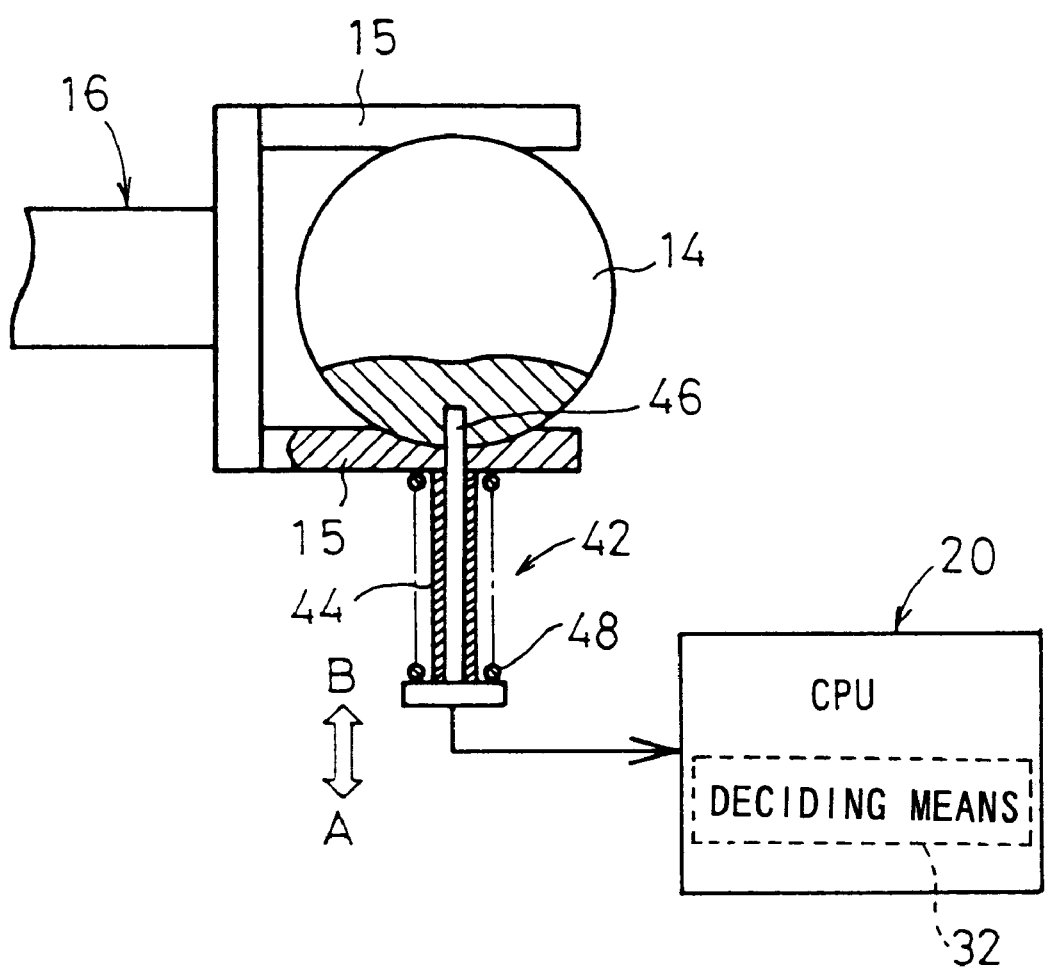
FIG. 4 shows a schematic plan view illustrating an apparatus for deciding the heated state of the metal billet according to a second embodiment of the present invention.

FIG. 4 shows a schematic view illustrating an arrangement of an apparatus 40 for deciding the heated state of the metal billet according to a second embodiment of the present invention. The same constitutive components as those of the heated state-deciding apparatus 10 according to the first embodiment are designated by the same reference numerals, detailed explanation of which will be omitted.

The heated state-deciding apparatus 40 comprises a temperature-measuring means 42. The temperature-measuring means 42 comprises a cleaning cylinder 44 held on one of insulating members 15, a thermocouple 46 arranged in the cylinder 44 movably back and forth, and a spring 48 for urging the thermocouple 46 in a direction (direction of the arrow A) to make separation from the billet 14.

In the heated state-deciding apparatus 40 constructed as described above, the billet 14 after the heating is gripped by the pair of insulating members 15 which construct the transport robot 16, and the billet 14 is transported to the unillustrated forming apparatus. During the transport, the thermocouple 46 is urged in a direction of the arrow B by the aid of an external pressing means (not shown). Accordingly, the thermocouple 46 is moved in the direction of the arrow B against the resilient force of the spring 48. The forward end of the thermocouple 46 is inserted by a predetermined length into the billet 14 after the heating to detect the temperature of the billet 14.

The temperature data detected by the thermocouple 46 is sent to CPU 20. The detected temperature is compared with the reference temperature range previously stored in CPU 20. Accordingly, it is decided whether or not the billet 14 after the heating is in the predetermined solid phase state.

Subsequently, when the urging force exerted on the thermocouple 46 is deenergized, the thermocouple 46 is moved in the direction of the arrow A by the aid of the resilient force of the spring 48. During this process, the forward end of the thermocouple 46, i.e., the temperature-measuring section enters the cylinder 44, and thus it is cleaned. Therefore, the melted part of the billet 14 adhered to the thermocouple 46 is removed automatically and reliably. Thus, an effect is obtained in that the temperature-detecting operation is performed continuously and highly accurately for a large number of billets 14. Further, the cleaning process is automatically effected by the forward and backward movement of the thermocouple 46 in the cylinder 44. Therefore, the cleaning operation itself is simplified all at once.

Figure 5:
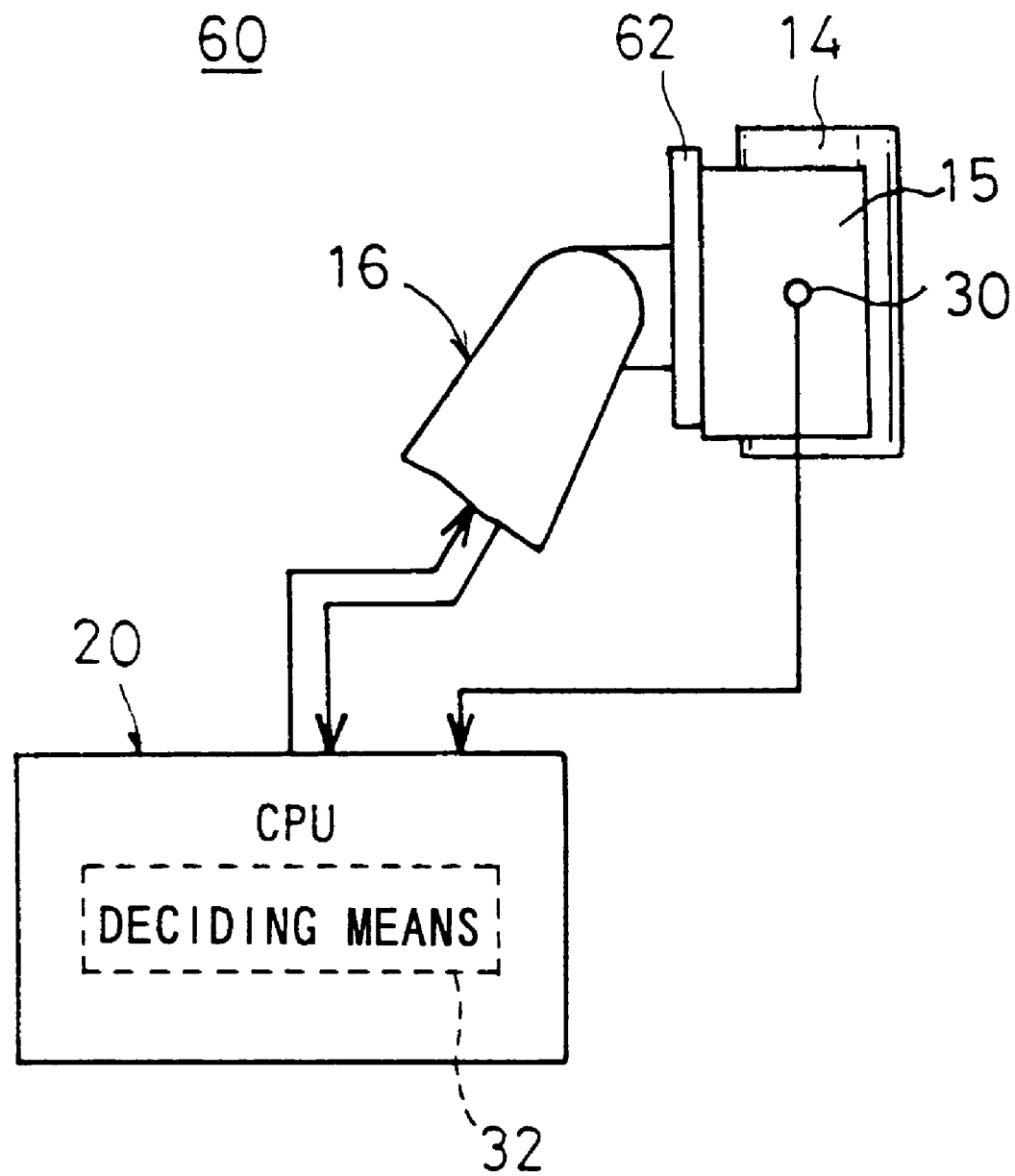
FIG. 5 schematically illustrates an arrangement of an apparatus for deciding the heated state of the metal billet according to a third embodiment of the present invention.

FIG. 5 schematically illustrates an arrangement of an apparatus 60 for deciding the heated state of the metal billet according to a third embodiment of the present invention. The same constitutive components as those of the heated state-deciding apparatuses 10, 40 according to the first and second embodiments are designated by the same reference numerals, detailed explanation of which will be omitted.

The heated state-deciding apparatus 60 comprises a weight-measuring unit (weight-detecting means) 62 installed to the transport robot 16, for detecting the weights of the billet 14 held by the insulating members 15 before and after the induction heating.

In the heated state-deciding apparatus 60 constructed as described above, at first, when the billet 14 before the heating is gripped by the insulating members 15 of the transport robot 16 to be transferred to the induction heating unit (not shown), the weight-measuring unit 62 installed to the transport robot 16 detects the weight of the billet 14 before the heating. Subsequently, after the billet 14 is induction-heated, the transport robot 16 grips the billet 14 after the heating to transfer it to the unillustrated forming apparatus. During the transfer process, the weight of the billet 14 after the heating is measured by the aid of the weight-measuring unit 62.

CPU 20 judges whether or not the billet 14 is heated to be in the predetermined solid phase state on the basis of the temperature data of the billet 14 after the heating inputted from the thermocouple 30. Further, CPU 20 again judges whether the solid phase state of the billet 14 after the heating is good or bad on the basis of the weight data inputted from the weight-measuring unit 62.

That is, CPU 20 calculates the melt-down amount of the billet 14 on the basis of the difference between the weights before and after the heating of the billet 14. The melt-down amount is compared with the previously measured and calculated reference weight range of optimum heating. It is judged whether or not the detected difference in weight is within the reference weight range. If it is judged that the difference is within the reference weight range, it is decided that the billet 14 is heated to have the predetermined solidus rate.

As described above, in the third embodiment, the detected temperature of the billet 14 after the heating is compared with the previously stored reference temperature range of optimum heating. Further, the difference between the weights of the billet 14 before and after the heating is compared with the previously stored reference weight range of optimum heating. Accordingly, an effect is obtained in that the decision of whether or not the billet 14 is heated to have the predetermined solidus rate is performed more accurately and reliably.

Figure 6:
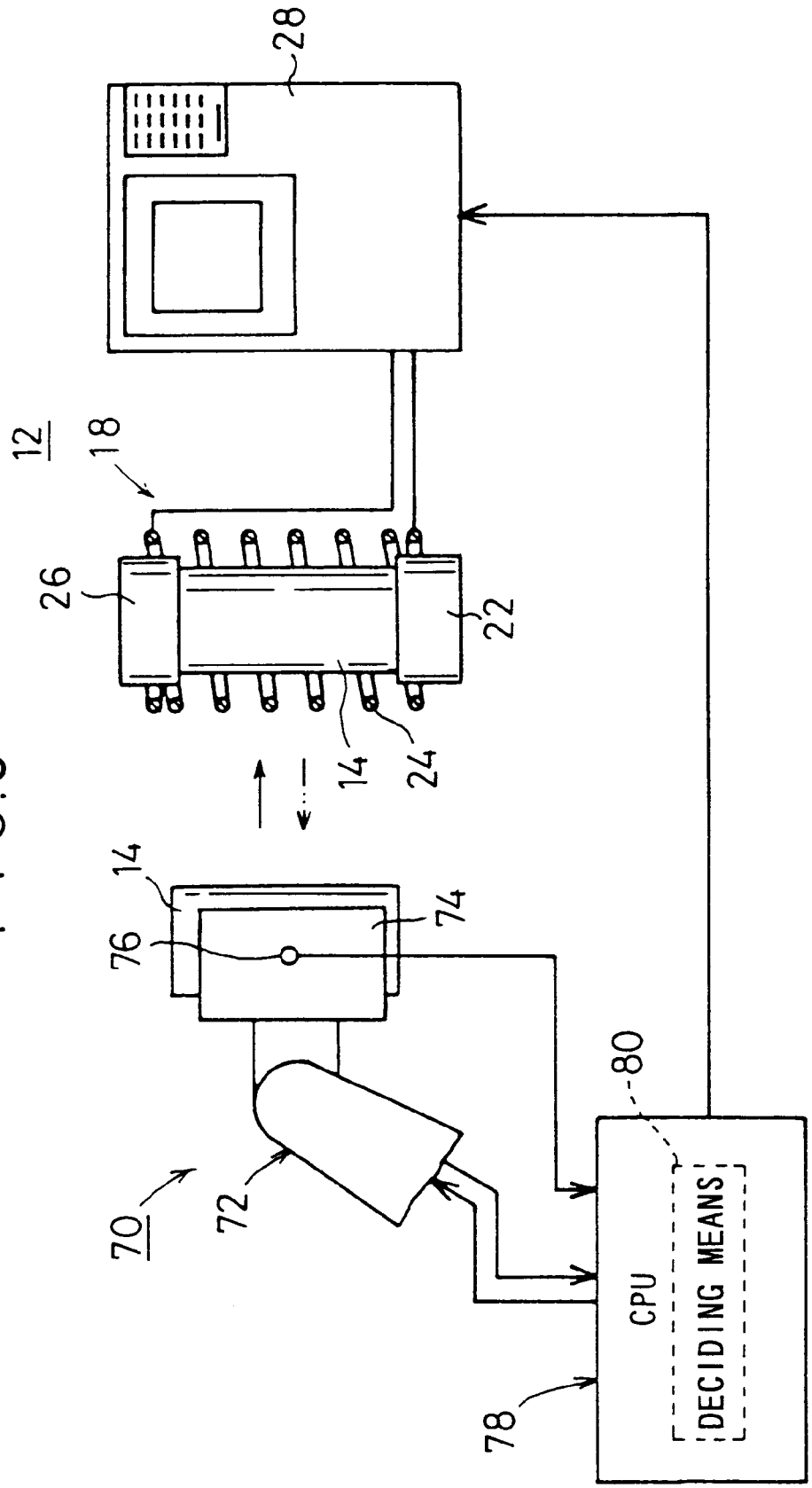
FIG. 6 schematically illustrates an arrangement of a heating line to be incorporated with an apparatus for deciding the heated state of the metal billet according to a fourth embodiment of the present invention.

FIG. 6 schematically illustrates an arrangement of a heating line 12 into which an apparatus 70 for deciding the heated state of the metal billet according to a fourth embodiment of the present invention is incorporated.

The heated state-deciding apparatus 70 comprises a hardness-measuring means 76 provided at one of the insulating members 74 as grip members of a transport robot (transport means) 72, for on-line detecting the hardness of the billet 14 during the transport by the transport robot 72, and a deciding means 80 as a function of CPU 78 for deciding whether or not the billet 14 is heated to be in the predetermined solid phase state on the basis of the hardness detected by the hardness-measuring means 76.

Figure 7:
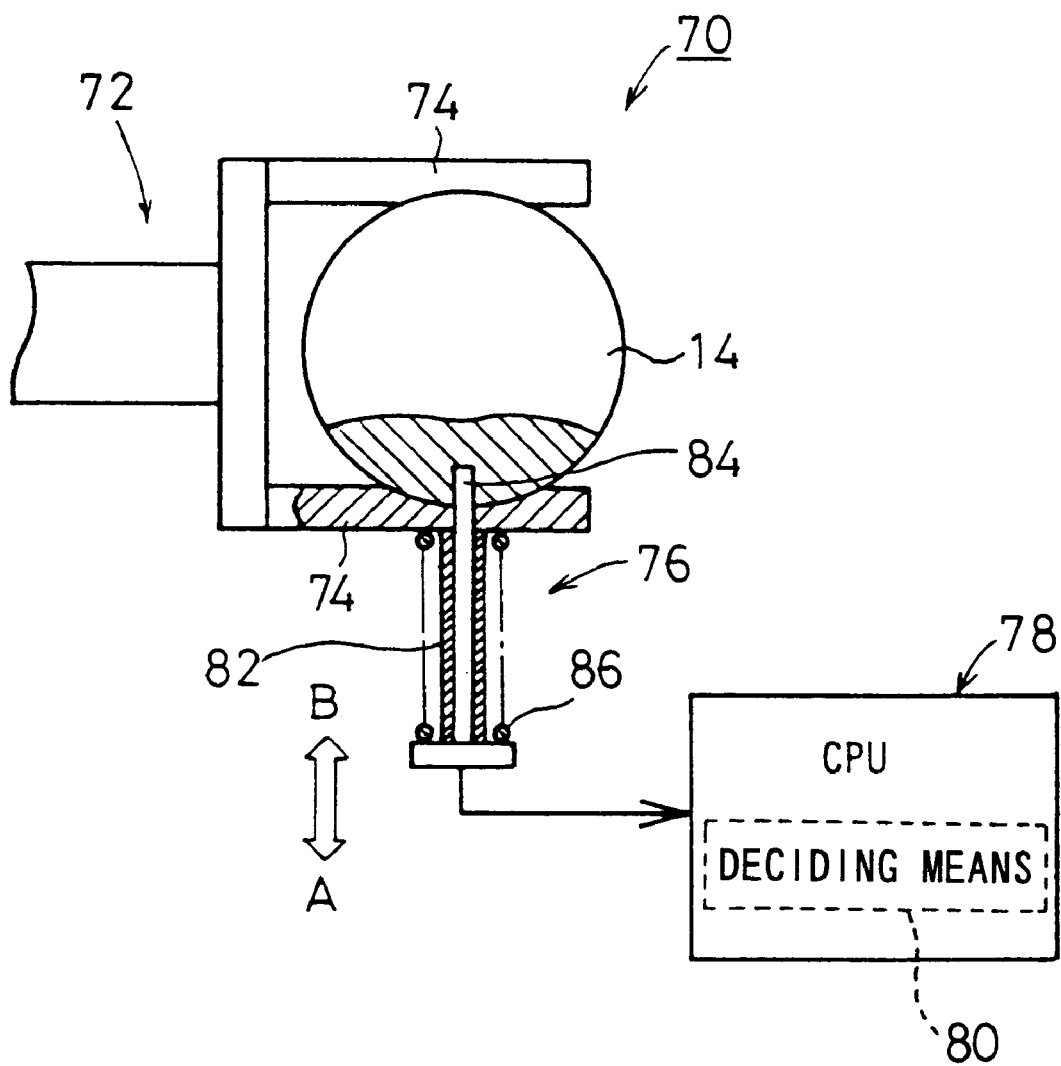
FIG. 7 shows a schematic plan view illustrating an apparatus for deciding the heated state of the metal billet according to the fourth embodiment of the present invention.

As shown in FIG. 7, the hardness-measuring means 76 comprises a cleaning cylinder 82 held by one of the insulating members 74, a detector probe 84 arranged movably back and forth in the cylinder 82, and a spring 86 for urging the detector probe 84 in a direction (direction of the arrow A) to make separation from the billet 14.

The hardness-measuring means 76 measures the hardness of the billet 14 on the basis of the load and the insertion speed obtained when the detector probe 84 is inserted into the billet 14. The hardness data is sent to CPU 78. In CPU 78, the detected hardness data is compared with the previously established hardness of optimum heating by the aid of the deciding means 80 as a function of CPU 78. Thus, it is decided whether the solidus rate of the billet 14 is good or bad.

Figure 8:
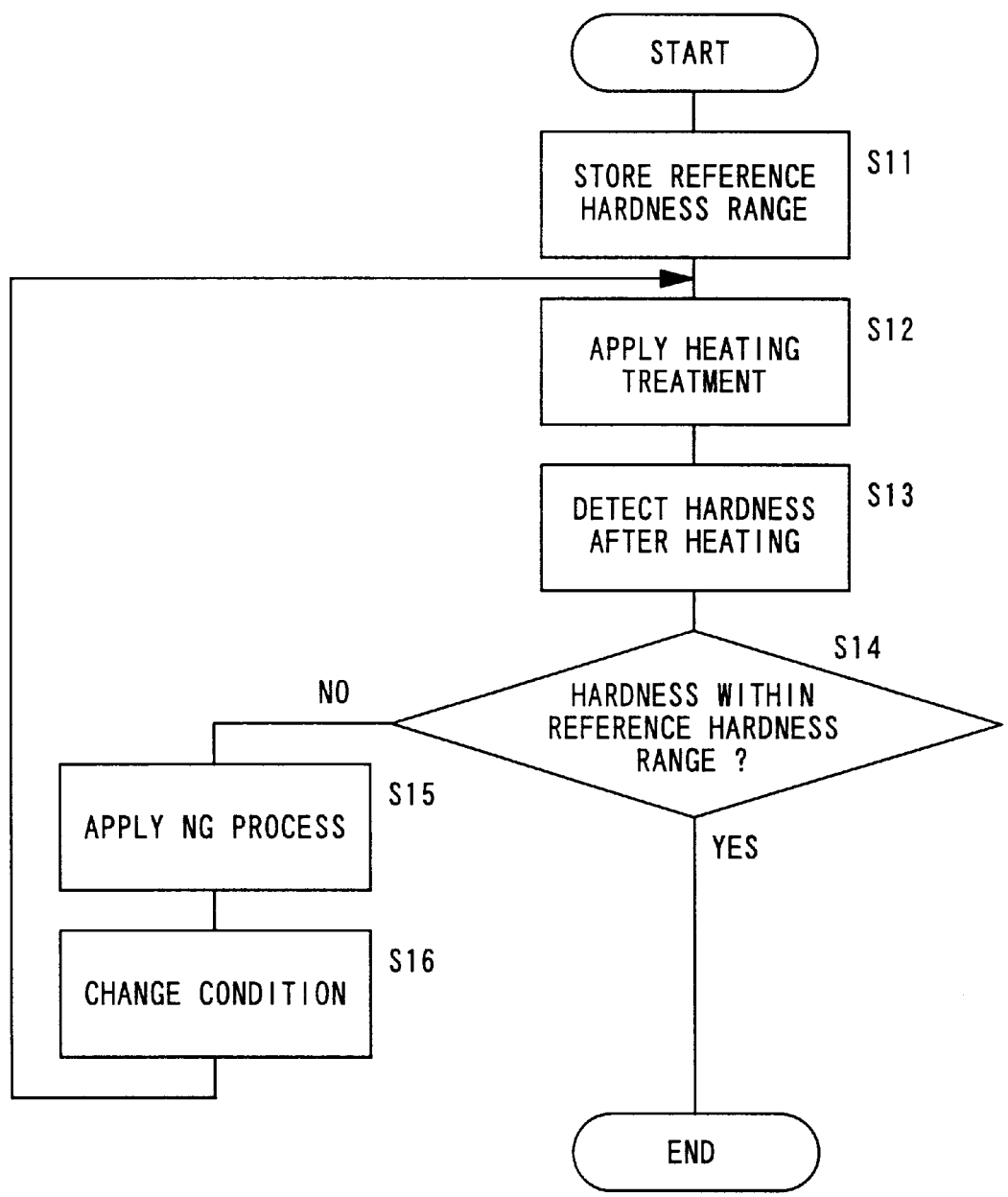
FIG. 8 shows a flow chart illustrating a method for deciding the heated state of the metal billet according to the fourth embodiment of the present invention.

The operation of the heated state deciding-apparatus 70 according to the fourth embodiment constructed as described above will be explained below on the basis of a flow chart shown in FIG. 8 in relation to the heating line 12.

At first, CPU 78 stores the reference hardness range for deciding whether the solidus rate of the billet 14 is good or bad on the basis of the hardness to be obtained when the optimum heating is performed, previously measured and calculated by using the billet 14 (step S11). Accordingly, the transport robot 72 is operated by the aid of CPU 78. The transport robot 72 places the billet 14 on the pedestal 22 which constructs the induction heating unit 18.

The induction heating unit 18 is operated as follows. That is, the coil 24 and the holding member 26 are lowered, and the billet 14 on the pedestal 22 is surrounded by the coil 24. The holding member 26 presses the billet 14 toward the pedestal 22 to hold it. In this state, the controller 28 is operated to allow the current to flow through the coil 24. Thus, the billet 14 is subjected to induction heating (step S12).

After completion of the induction heating treatment for the billet 14 effected by the induction heating unit 18, the coil 24 and the holding member 26 are lifted upwardly. The transport robot 72 holds the billet 14 after the heating, and it transports the billet 14 to an unillustrated forming apparatus. During the transport, as shown in FIG. 7, the detector probe 84 is urged in a direction of the arrow B by the aid of an external pressing means (not shown). Accordingly, the detector probe 84 is moved in the direction of the arrow B against the resilient force of the spring 86, and its forward end is inserted by a predetermined length into the billet 14 after the heating. The hardness of the billet 14 is detected on the basis of, for example, the load acting on the detector probe 84. The hardness data of the billet 14 detected by the hardness-measuring means 76 is sent to CPU 78 (step S13).

The deciding means 82 of CPU 78 judges, in a step S14, whether or not the hardness of the billet 14 detected by the hardness-measuring means 76 is within the previously stored reference hardness range. If it is judged that the detected hardness is within the reference hardness range (YES in the step S14), it is decided that the billet 14 is heated to have the predetermined solidus rate. The billet 14 is sent to the unillustrated forming apparatus.

On the other hand, if it is judged that the detected hardness is without the reference hardness range (NO in the step S14), the routine proceeds to a step S15 to apply an NG process. Specifically, the billet 14 is discarded, or the billet 14 is subjected to the heating treatment again effected by the induction heating unit 18. Further, the routine proceeds to a step S16 to change the condition of the heating effected by the controller 28. Specifically, the control condition of the controller 28 including, for example, the output voltage and the heating time is corrected.

In the fourth embodiment, the hardness-measuring means 76 is installed to one of the insulating members 74 which constructs the transport robot 72. When the billet 14 after the induction heating treatment is held and transported to the unillustrated forming apparatus by the aid of the transport robot 72, the hardness of the billet 14 is directly detected on-line by the aid of the hardness-measuring means 76. Subsequently, the hardness of the billet 14 detected by the hardness-measuring means 76 is compared with the reference hardness range. Thus, it is decided whether the solidus ratio of the billet 14 is good or bad.

Therefore, it is possible to accurately and easily detect whether the solidus ratio is good or bad in real time for each of the billets 14. The forming operation, which is performed by using the billet 14, is carried out to give a high quality. Thus, an effect is obtained in that the dispersion of product quality can be effectively avoided. Further, it is unnecessary to stop the operation of the heating line 12, it is possible to efficiently feed the billet 14 having the desired solidus ratio, and it is possible to greatly improve the productivity.

If the billet 14 after the heating does not have the predetermined solidus rate, CPU 78 can change the heating condition of the controller 28 on-line, making it possible to stabilize the product quality. During this procedure, if the hardness of the billet 14, which is successively detected by the hardness-measuring means 76, has a tendency to decrease, or if the hardness of the billet 14 has a tendency to increase, then CPU 78 can be used to correct, for example, the output voltage and the heating time of the controller 28. Accordingly, the billet 14 is allowed to approach the hardness of optimum heating, making it possible to efficiently and stably obtain the billet 14 having the predetermined solidus rate.

Figure 9:
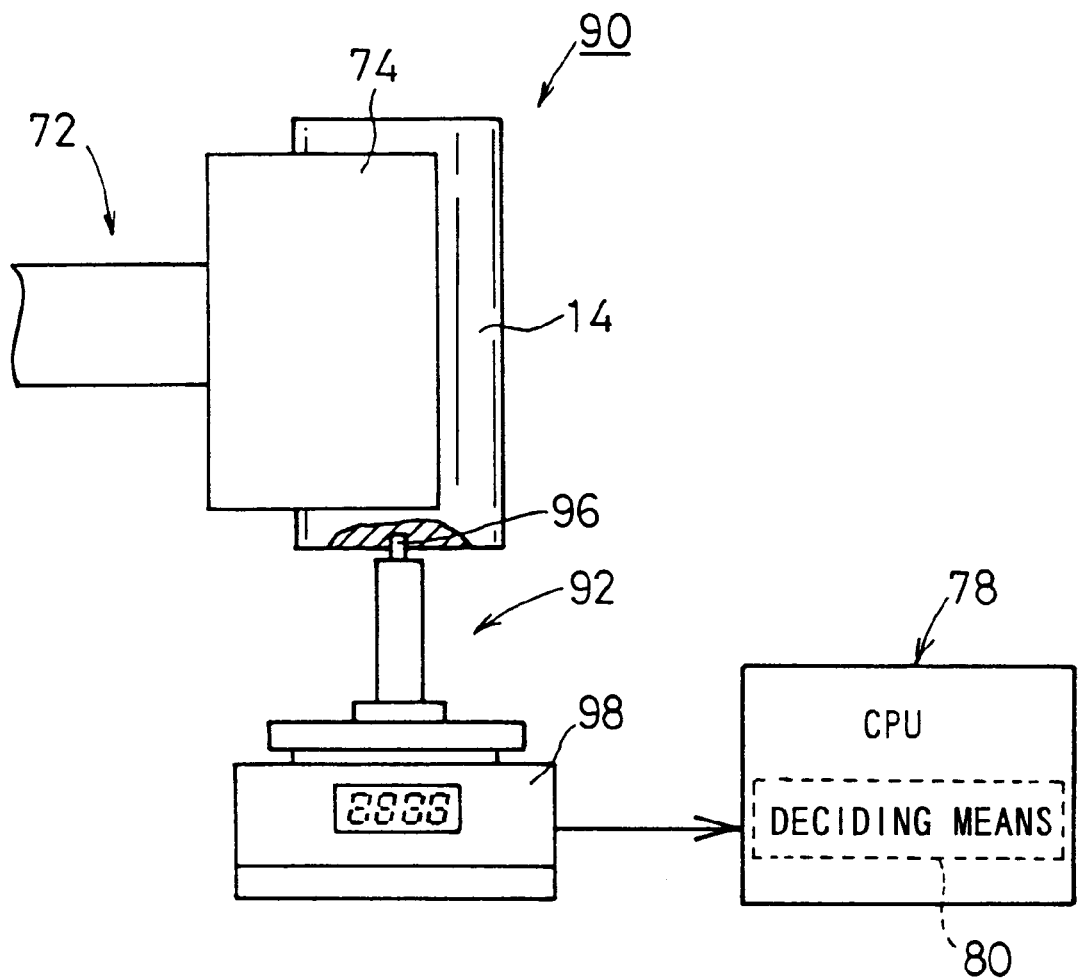
FIG. 9 schematically illustrates an arrangement of an apparatus for deciding the heated state of the metal billet according to a fifth embodiment of the present invention.

FIG. 9 shows a schematic plan view illustrating an apparatus 90 for deciding the heated state of the metal billet according to a fifth embodiment of the present invention. The same constitutive components as those of the heated state-deciding apparatus 70 according to the fourth embodiment are designated by the same reference numerals, detailed explanation of which will be omitted.

The heated state-deciding apparatus 90 comprises a hardness-measuring means 92 arranged within a range of movement of the transport robot 72. The hardness-measuring means 92 comprises a detector probe 96 to be urged by an unillustrated spring, and a measuring instrument 98 for measuring the load acting on the detector probe 96. The load exerted by the billet 14, which is measured by the measuring instrument 98, is sent as hardness data to CPU 78.

In the heated state-deciding apparatus 90 constructed as described above, the billet 14 after the heating is gripped by the pair of insulating members 74 which construct the transport robot 72, and it is transported to the unillustrated forming apparatus. During this process, the billet 14 is transferred to the hardness-measuring means 92. The top surface or the bottom surface of the billet 14 is moved toward the detector probe 96 of the hardness-measuring means 92 in a state in which the transport robot 72 grips the billet 14.

Accordingly, the detector probe 96 is inserted into the billet 14 after the heating. The load, which is generated during the insertion, is detected by the measuring instrument 98 by the aid of the detector probe 96, and an obtained result is sent as hardness data of the billet 14 to CPU 78. CPU 78 compares the detected hardness data with the previously recorded reference hardness range to decide whether or not the billet 14 after the heating is in the predetermined solid phase state.

Subsequently, the transport robot 72 is moved in a direction to make separation from the hardness-measuring means 92, and the detector probe 96 is disengaged from the billet 14. The billet 14 is selectively transported by the transport robot 72, for example, to the unillustrated forming apparatus or to the NG process station.

Figure 10:
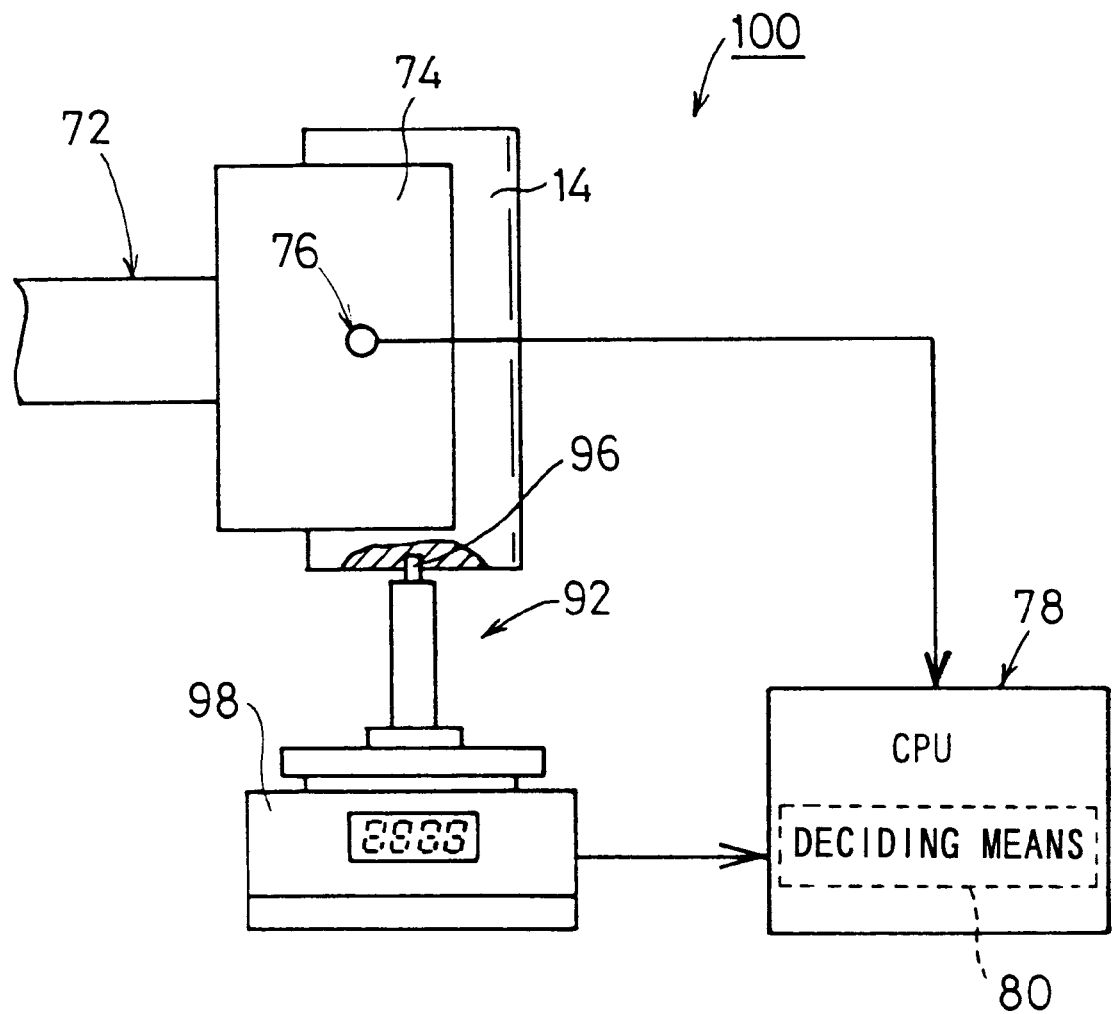
FIG. 10 schematically illustrates an arrangement of an apparatus for deciding the heated state of the metal billet according to a sixth embodiment of the present invention.

FIG. 10 schematically illustrates an arrangement of an apparatus 100 for deciding the heated state of the metal billet according to a sixth embodiment of the present invention. The same constitutive components as those of the heated state-deciding apparatuses 70, 90 according to the fourth and fifth embodiments are designated by the same reference numerals, detailed explanation of which will be omitted.

The heated state-deciding apparatus 100 comprises a hardness-measuring means 76 installed to a transport robot 72. A hardness-measuring means 92 is arranged within a range of movement of the transport robot 72. Therefore, the heated state-deciding apparatus 100 is operated as follows. That is, the hardness of the billet 14 is measured at its side surface by the aid of the hardness-measuring means 76 provided for the transport robot 72, while the hardness of the billet 14 is measured at its top or bottom surface by the aid of the hardness-measuring means 92.

Accordingly, in the sixth embodiment, it is possible to more accurately detect the hardness of the billet 14 after the heating. Thus, an effect is obtained in that it is possible to accurately decide whether the solid phase state of the billet is good or bad.

Figure 11:
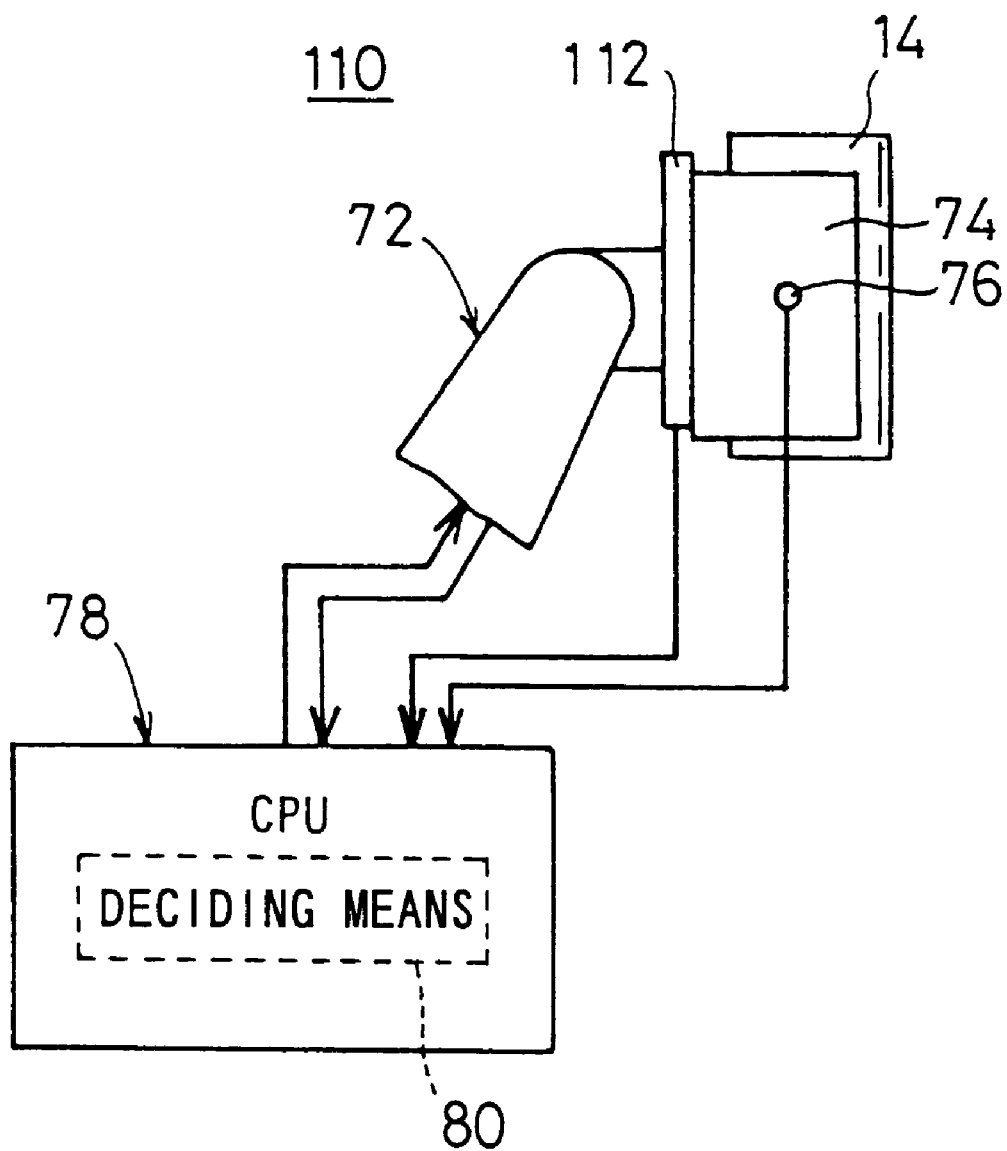
FIG. 11 schematically illustrates an arrangement of an apparatus for deciding the heated state of the metal billet according to a seventh embodiment of the present invention.

FIG. 11 schematically illustrates an arrangement of an apparatus 110 for deciding the heated state of the metal billet according to a seventh embodiment of the present invention. The same constitutive components as those of the heated state-deciding apparatus 70 according to the fourth embodiment are designated by the same reference numerals, detailed explanation of which will be omitted.

The heated state-deciding apparatus 110 comprises the hardness-measuring means 76 as well as a weight-measuring unit (weight-detecting means) 112 for detecting the weights of the billet 14 before and after the induction heating, the billet 14 being held by the insulating members 74 of the transport robot 72.

The heated state-deciding apparatus 110 constructed as described above is operated as follows. That is, at first, when the billet 14 before the heating is transferred toward the induction heating unit (not shown) while being gripped by the insulating members 74 of the transport robot 72, the weight-measuring unit 112 installed to the transport robot 72 detects the weight of the billet 14 before the heating. Subsequently, after the billet 14 is induction-heated, the transport robot 72 grips the billet 14 after the heating to transfer it to the unillustrated forming apparatus. During the transfer process, the weight of the billet 14 after the heating is measured by the aid of the weight-measuring unit 112.

CPU 78 judges whether or not the billet 14 is heated to be in the predetermined solid phase state on the basis of the hardness data of the billet 14 after the heating inputted from the hardness-measuring means 76. Further, CPU 78 again judges whether the solid phase state of the billet 14 after the heating is good or bad on the basis of the weight data inputted from the weight-measuring unit 112.

That is, CPU 78 calculates the melt-down amount of the billet 14 on the basis of the difference between the weights before and after the heating of the billet 14. The melt-down amount is compared with the previously measured and calculated reference weight range of optimum heating. If it is judged that the detected difference in weight (melt-down amount) is within the reference weight range, it is decided that the billet 14 is heated to have the predetermined solidus rate.

As described above, in the seventh embodiment, the detected hardness of the billet 14 after the heating is compared with the previously stored reference hardness range of optimum heating. Further, the difference between the weights of the billet 14 before and after the heating is compared with the previously stored reference weight range of optimum heating. Accordingly, an effect is obtained in that the decision of whether or not the billet 14 is heated to have the predetermined solidus rate is performed more accurately and reliably.

Figure 12:
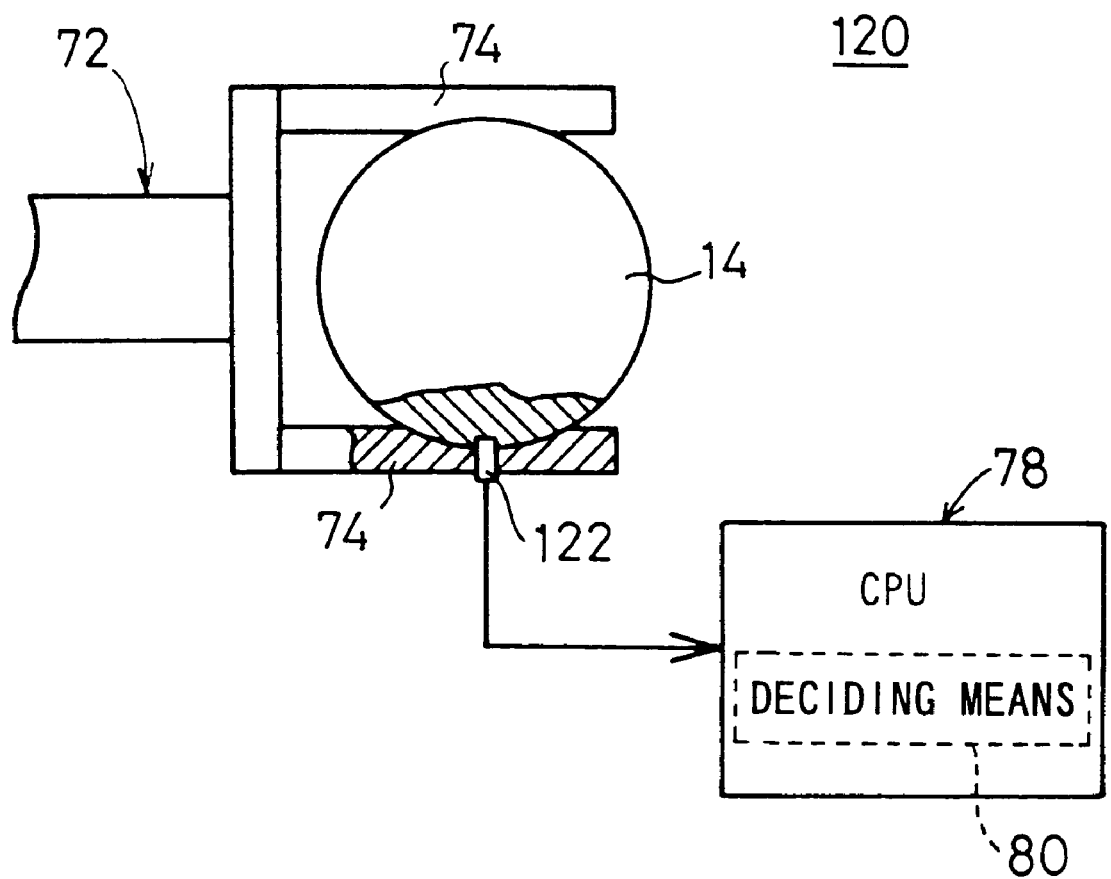
FIG. 12 schematically illustrates an arrangement of an apparatus for deciding the heated state of the metal billet according to an eighth embodiment of the present invention.

FIG. 12 schematically illustrates an arrangement of an apparatus 120 for deciding the heated state of the metal billet according to an eighth embodiment of the present invention. The same constitutive components as those of the heated state-deciding apparatus 70 according to the fourth embodiment are designated by the same reference numerals, detailed explanation of which will be omitted.

The heated state-deciding apparatus 120 comprises the hardness-measuring means (not shown), as well as a thermocouple (temperature-detecting means) 12 installed to the transport robot 72 for detecting the temperature of the billet 14 after the induction heating held by the insulating members 74.

In the heated state-deciding apparatus 120 constructed as described above, CPU 78 stores the reference temperature range for deciding whether the solidus rate of the billet 14 is good or bad, from the temperature of optimum heating previously measured by using the billet 14. Accordingly, after the billet 14 is induction-heated by the unillustrated induction heating unit, the transport robot 72 holds the billet 14 to transport it to the unillustrated forming apparatus.

During this process, when the pair of insulating members 74 of the transport robot 72 hold the billet 14 after the heating, the forward end of the thermocouple 122, which is provided at one of the insulating members 74, is inserted by a predetermined amount into the billet 14. Accordingly, the temperature of the billet 14 after the heating is detected by the aid of the thermocouple 122. The temperature data is sent to CPU 78. The deciding means 80 of CPU 78 judges whether or not the detected temperature of the billet 14 is within the reference temperature range to decide whether or not the billet 14 is heated to have the predetermined solidus rate.

On the other hand, the hardness of the billet 14 after the heating is detected by the unillustrated hardness-measuring means provided for the transport robot 72 to decide whether the solid phase state of the billet 14 is good or bad. Accordingly, the operation to decide whether or not the billet 14 is heated to be in the predetermined solid phase state is carried out more accurately.

Figure 13:
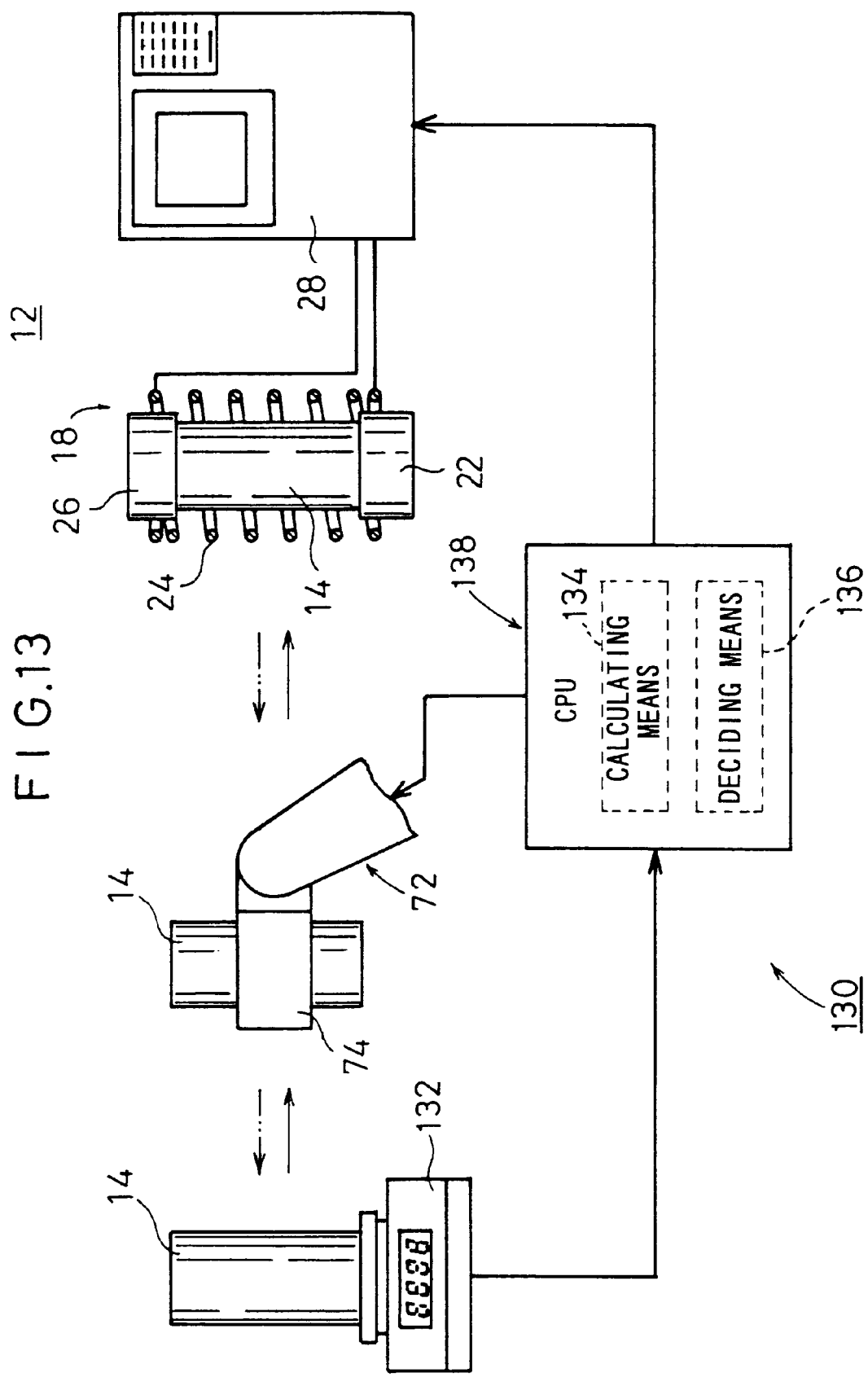
FIG. 13 schematically illustrates an arrangement of a heating line to be incorporated with an apparatus for deciding the heated state of the metal billet according to a ninth embodiment of the present invention.

FIG. 13 schematically illustrates an arrangement of a heating line 12 to be incorporated with an apparatus 130 for deciding the heated state of the metal billet according to a ninth embodiment of the present invention.

The heated state-deciding apparatus 130 comprises a weight-measuring unit (weight-measuring means) 132 for detecting the weights of the billet 14 before and after the induction heating, a calculating means 134 for obtaining the difference between the weights before and after the induction heating detected by the weight-measuring unit 132 as a measured value of the melt-down amount of the billet 14, and a deciding means 136 for judging whether or not the measured value is within the reference range of the melt-down amount concerning the predetermined solidus rate.

The calculating means 134 and the deciding means 136 are included in the function of CPU 138. Practically, the deciding means 136 sets the reference range of the melt-down amount concerning the predetermined solidus rate to be 100 g to 200 g when a billet 14 of 3 inches×155 mm is used. If the measured value is not more than 100 g, or if the measured value is not less than 200, then the billet 14 is judged to be defective. The solidus rate should be within a range of 32% to 49%.

Figure 14:
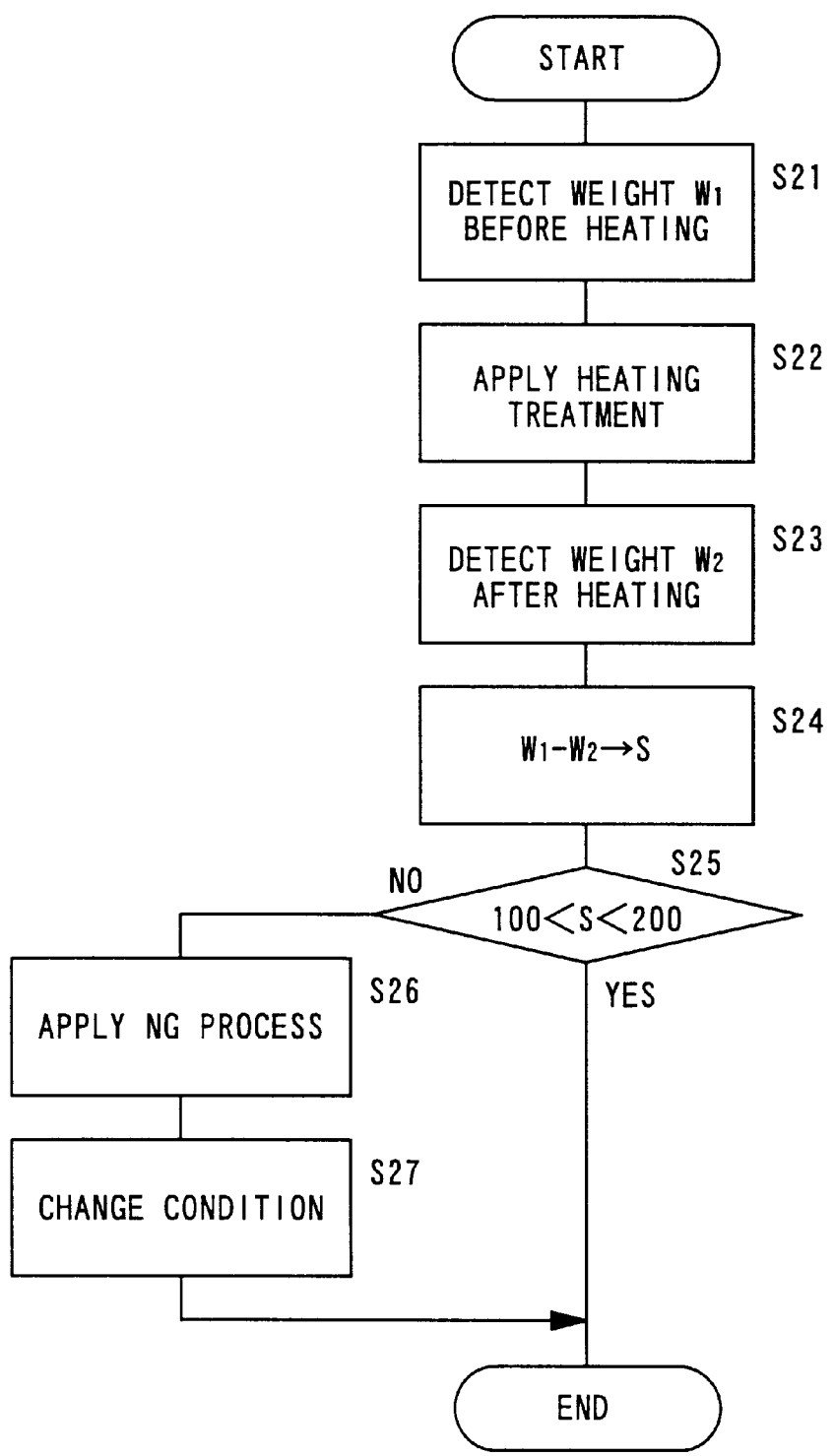
FIG. 14 shows a flow chart illustrating a method for deciding the heated state of the metal billet according to the ninth embodiment of the present invention.

The operation of the apparatus 130 for deciding the heated state according to the ninth embodiment constructed as described above will be explained below on the basis of a flow chart shown in FIG. 14 in relation to the heating line 12.

At first, the transport robot 72 holds the billet 14 by the aid of the insulating members 74 to transport the billet 14 to the weight-measuring unit 132. The weight-measuring unit 132 is used to measure the weight W1 of the billet 14 before the heating. The measured data is sent to CPU 138 (step S21).

Subsequently, the transport robot 74 transfers the billet 14 from the weight-measuring unit 132 to the induction heating unit 18 to place the billet 14 on the pedestal 22. The induction heating unit 18 is operated as follows. That is, the coil 24 and the holding member 26 are lowered, and the billet 14 on the pedestal 22 is surrounded by the coil 24. The holding member 26 presses the billet 14 toward the pedestal 22 to hold it. In this state, the controller 28 is operated to allow the current to flow through the coil 24. Thus, the billet 14 is subjected to induction heating (step S22).

After completion of the induction heating treatment for the billet 14 effected by the induction heating unit 18, the coil 24 and the holding member 26 are lifted upwardly. The transport robot 16 holds the billet 14 after the heating, and it transports the billet 14 to the weight-measuring unit 132. The weight-measuring unit 132 measures the weight W2 of the billet 14 after the heating. The measured data is sent to CPU 138 (step S23).

In CPU 138, the calculating means 134 is used to obtain the difference in weight between the weight W1 before the heating and the weight W2 after the heating, as the measured value S of the melt-down amount of the billet 14 (step S24). The deciding means 136 is used to judge whether or not the measured value S is within the reference range of the melt-down amount concerning the predetermined solidus rate (step S25). If it is judged that the measured value S is within the reference range, i.e., within the range of 100 g to 200 g (YES in the step S25), it is decided that the billet 14 is heated to have the predetermined solidus rate. The billet 14 is sent to the unillustrated forming apparatus.

On the other hand, if it is judged that the measured value S is without the reference range (NO in the step S25), the routine proceeds to a step S26 to apply an NG process. Specifically, the billet 14 is discarded, or the billet 14 is subjected to the heating treatment again effected by the induction heating unit 18. Further, the routine proceeds to a step S27 to change the condition of the heating (operation condition) effected by the controller 28. Specifically, the control condition of the controller 28 including, for example, the output voltage and the heating time is changed.

In the ninth embodiment, the weights W1, W2 of the billet 14 before and after the heating are detected. The measured value S of the melt-down amount of the billet 14 is calculated on the basis of the difference in weight. The measured value S is compared with the previously established reference range of the melt-down amount. Thus, it is decided whether the solidus rate of the billet 14 is good or bad.

Therefore, it is possible to accurately and easily detect whether the solidus ratio is good or bad in real time for each of the billets 14. The forming operation, which is performed by using the billet 14, is carried out to give a high quality. Thus, an effect is obtained in that the dispersion of product quality can be effectively suppressed. Further, it is unnecessary to stop the operation of the heating line 12, it is possible to efficiently feed the billet 14 having the desired solidus ratio, and it is possible to greatly improve the productivity.

If the billet 14 after the heating does not have the predetermined solidus rate, CPU 138 can change the heating condition of the controller 28 on-line, making it possible to stabilize the product quality. During this procedure, if the measured value S, which is successively detected by the calculating means 134, has a tendency to decrease, it is judged that the heating temperature for the billet 14 is low. On the other hand, if the measured value S has a tendency to increase, it is judged that the heating temperature for the billet 14 is high. Accordingly, CPU 138 is used to correct, for example, the output voltage and the heating time of the controller 28. Thus, it is possible to efficiently and stably obtain the billet 14 having the predetermined solidus rate.

FIG. 15 schematically illustrates an arrangement of a heating line 12 to be incorporated with an apparatus 150 for deciding the heated state of the metal billet according to a tenth embodiment of the present invention. The same constitutive components as those of the heated state-deciding apparatus 130 according to the ninth embodiment are designated by the same reference numerals, detailed explanation of which will be omitted.

The heated state-deciding apparatus 150 comprises a transport robot (transport means) 152. The transport robot 152 is installed with a weight-measuring unit (weight-detecting means) 154 for detecting the weights of the billet 14 held by the transport robot 152 before and after the induction heating. The transport robot 152 is provided with insulating members 156 made of ceramic or the like for gripping the billet 14.

In the heated state-deciding apparatus 150 constructed as described above, at first, when the billet 14 before the heating is transferred to the induction heating unit 18 in a state of being gripped by the insulating members 156 of the transport robot 152, the weight-measuring unit 154 installed to the transport robot 152 detects the weight of the billet 14 before the heating. Subsequently, when the billet 14 is placed on the pedestal 22 of the induction heating unit 18 by the aid of the transport robot 152, the transport robot 152 is separated from the pedestal 22. The coil 24 and the holding member 26 are lowered, and the current is allowed to flow through the coil 24 by the aid of the controller 28. Accordingly, the billet 14 is induction-heated.

The billet 14 after the heating, which is placed on the pedestal 22, is gripped by the transport robot 152, and it is transferred to the unillustrated forming apparatus. During the transfer process, the weight of the billet 14 after the heating is measured by the aid of the weight-measuring unit 154.

The calculating means 134 of CPU 138 calculates the measured value S of the melt-down amount of the billet 14 on the basis of the weights of the billet 14 before and after the heating. The deciding means 136 judges whether or not the measured value S is within the reference range of the melt-down amount concerning the predetermined solidus rate. If it is judged that the measured value S is within the reference range of the melt-down amount concerning the predetermined solidus rate, it is decided that the billet 14 is heated to have the predetermined solidus rate.

As described above, in the tenth embodiment, the weight is measured before and after the heating for each of the billets 14 to decide the solidus rate of the billet 14. Therefore, an effect is obtained in the same manner as in the ninth embodiment. Further, in the tenth embodiment, the weight-measuring unit 154 is installed to the transport robot 152. The weights of the billet 14 before and after the heating are measured during the process of import and export of the billet 14 with respect to the induction heating unit 18 by using the transport robot 152. Therefore, it is possible to more quickly and easily decide whether or not the solidus rate of the billet 14 is good or not, and it is possible to easily achieve power saving and labor saving.

As explained above, according to the method and the apparatus for deciding the heated state of the metal billet concerning the present invention, the temperature of the billet is detected after the heating by the aid of the temperature-measuring means provided for the transport means, during the process of transport of the heated metal billet while being held by the transport means. It is decided whether or not the metal billet is heated to be in the predetermined solid phase state on the basis of the detected temperature. Accordingly, it is possible to easily and reliably decide whether or not each of the metal billets has the predetermined solidus ratio in real time, giving no dispersion of product quality, and making it possible to obtain a high quality product efficiently and easily. Further, when the solidus rate of the metal billet is decided, the line is not stopped. Thus, it is possible to further improve the productivity.

According to the method and the apparatus for deciding the heated state of the metal billet concerning the present invention, the hardness of the billet is detected after the heating by the aid of the hardness-measuring means provided for the transport means, during the process of transport of the heated metal billet while being held by the transport means. It is decided whether or not the metal billet is heated to be in the predetermined semisolidified state on the basis of the detected hardness. Accordingly, it is possible to easily and reliably decide on line whether or not each of the metal billets is in the predetermined semisolidified state in real time, giving no dispersion of product quality, and making it possible to obtain a high quality product efficiently and easily. Further, when the semisolidified state of the metal billet is decided, the line is not stopped. Thus, it is possible to further improve the productivity.

Further, according to the method and the apparatus for deciding the heated state of the metal billet concerning the present invention, the weights of the metal billet are detected before and after the heating. It is judged whether or not the difference in weight therebetween is within the reference range of the melt-down amount concerning the predetermined solidus rate to decide whether or not the solidus rate of the metal billet is good or bad. Accordingly, it is possible to easily and reliably decide whether or not each of the metal billets has the predetermined solidus rate, giving no dispersion of product quality, and making it possible to obtain a high quality product efficiently and easily. Further, when the solidus rate of the metal billet is decided, it is unnecessary to stop the line. Thus, it is possible to further improve the productivity.

What is claimed is:

1. A method for deciding a heated state of a metal billet, comprising the steps of:

heating said metal billet;

holding said heated metal billet by means of a transport means for transferring the metal billet from a heating position to a forming machine, while detecting a temperature of said metal billet during said transport; and deciding whether or not said metal billet is heated to attain a predetermined solid phase state on the basis of said detected temperature.

2. The method according to claim 1, further comprising the step of changing a heating condition for said metal billet if it is decided that said metal billet is not heated to be in said predetermined solid phase state.

3. The method according to claim 1, wherein weights of said metal billet before and after said heating are detected, and it is decided whether or not said metal billet is heated to be in said predetermined solid phase state on the basis of said weights before and after said heating and said detected temperature.

4. A method for deciding a heated state of a metal billet, comprising the steps of:

heating said metal billet;

holding said heated metal billet by means of a transport means for transferring the metal billet from a heating position to a forming machine, while detecting a hardness of said metal billet by means of at least one of a load imposed on an insertion member inserted into said metal billet or an insertion speed of said insertion member; and deciding whether or not said metal billet is heated to attain a predetermined semisolidified state on the basis of said detected hardness.

5. The method according to claim 4, further comprising the step of changing a heating condition for said metal billet if it is decided that said metal billet is not heated to be in said predetermined semisolidified state.

6. The method according to claim 4, wherein weights of said metal billet before and after said heating are detected, and it is decided whether or not said metal billet is heated to be in said predetermined semisolidified state on the basis of said weights before and after said heating and said detected hardness.

7. The method according to claim 6, wherein a temperature of said metal billet is detected during said transport, and it is decided whether or not said metal billet is heated to be in said predetermined semisolidified state on the basis of said detected temperature, said weights before and after said heating, and said detected hardness.

8. The method according to claim 4, wherein a temperature of said metal billet is detected during said transport, and it is decided whether or not said metal billet is heated to be in said predetermined semisolidified state on the basis of said detected temperature and said detected hardness.

9. A method for deciding a heated state of a metal billet, wherein said metal billet is imported and exported with respect to an induction heating unit by the aid of a transport means for transferring the metal billet from a heating position to a forming machine, and it is decided whether or not said metal billet is heated to have a predetermined solidus rate when said metal billet is heated by using said induction heating unit, said method comprising the steps of:

detecting a weight of said metal billet while the billet is being held by said transport means and before said induction heating;

detecting a weight of said metal billet while the billet is being held by said transport means and after said induction heating;

obtaining a difference between said detected weights before and after said induction heating, as a measured value of a melt-down amount of said metal billet; and judging whether or not said measured value is within a reference range of said melt-down amount at said predetermined solidus rate to decide that said metal billet is heated to have said predetermined solidus rate if it is judged that said measured value is within said reference range.

10. The method according to claim 9, wherein said weights of said metal billet before and after said heating are detected by using a weight-detecting means provided for said transport means when said metal billet is held by said transport means.

11. The method according to claim 9, wherein said transport means holds said metal billet by the aid of an insulating member.

12. The method according to claim 9, further comprising the step of changing an operation condition of said induction heating unit if it is judged that said measured value is without said reference range.

13. An apparatus for deciding a heated state of a metal billet, wherein said metal billet is imported and exported with respect to a heating means, said metal billet is heated by using said heating means, and then it is decided whether or not said metal billet is heated to attain a predetermined solid phase state, said apparatus comprising:

heating means for heating said metal billet;

transport means for transporting said metal billet to said heating means, and from said heating means to a forming machine;

temperature-measuring means disposed on said transport means, for detecting a temperature of said metal billet while the billet is held by said transport means and during transport effected by said transport means; and deciding means for deciding whether or not said metal billet is heated to attain said predetermined solid phase state on the basis of the detected temperature.

14. The apparatus according to claim 13, wherein said temperature-measuring means comprises a thermocouple installed to a grip member of said transport means for holding said metal billet.

15. The apparatus according to claim 14, wherein said temperature-measuring means comprises:

a cleaning cylinder for inserting said thermocouple movably back and forth with respect to said grip member to remove adhesive matters adhered to a forward end of said thermocouple; and a spring for moving said thermocouple back and forth in said cleaning cylinder.

16. The apparatus according to claim 13, wherein:

said transport means comprises a weight-detecting means for detecting a weight of said metal billet held by said grip member; and said deciding means has a function to decide whether or not said metal billet is heated to be in said predetermined solid phase state on the basis of a difference in weight of said metal billet before and after said heating.

17. An apparatus for deciding a heated state of a metal billet, wherein said metal billet is imported and exported with respect to a heating means, said metal billet is heated by using said heating means, and then it is decided whether or not said metal billet is heated to attain a predetermined semisolidified state, said apparatus comprising:

heating means for heating said metal billet;

transport means for transporting said metal billet to said heating means, and from said heating means to a forming machine;

hardness-measuring means for detecting a hardness of said metal billet by means of at least one of a load imposed on an insertion member inserted into said metal billet or an insertion speed of said insertion member during a period in which said metal billet after said heating is transported by said transport means; and deciding means for deciding whether or not said metal billet is heated to attain said predetermined semisolidified state on the basis of said detected hardness.

18. The apparatus according to claim 17, wherein said hardness-measuring means is installed to a grip member of said transport means for holding said metal billet.

19. The apparatus according to claim 17, wherein said hardness-measuring means is arranged within a range of movement of said transport means in order to detect said hardness of said metal billet held by said transport means.

20. The apparatus according to claim 17, wherein said transport means comprises a weight-detecting means for detecting weights before and after said heating of said metal billet held by said grip member.

21. The apparatus according to claim 17, wherein said transport means comprises a temperature-detecting means for detecting a temperature after said heating of said metal billet held by said grip member.

22. The apparatus according to claim 20, wherein said transport means comprises a temperature-detecting means for detecting a temperature after said heating of said metal billet held by said grip member.

23. An apparatus for deciding a heated state of a metal billet, wherein said metal billet is imported and exported with respect to, and it is decided whether or not said metal billet is heated to attain a predetermined heated state to decide a solidus rate of said metal billet, said apparatus comprising:

heating means comprising an induction heating unit for heating said metal billet;

transport means for transporting said metal billet to said heating means, and from said heating means to a forming machine;

weight-detecting means for detecting weights of said metal billet before and after heating by said induction heating unit;

calculating means for obtaining a difference between said detected weights before and after said induction heating, as a measured value of a melt-down amount of said metal billet; and deciding means for judging whether or not said measured value is within a reference range of said melt-down amount at a predetermined solidus rate.

24. The apparatus according to claim 23, wherein said weight-detecting means is installed to said transport means in order to detect said weights before and after said induction heating of said metal billet held by said transport means.

25. The apparatus according to claim 23, wherein said transport means comprises an insulating member for holding said metal billet.

26. The apparatus according to claim 23, further comprising a control means for changing an operation condition of said induction heating unit if it is judged that said measured value is without said reference range.

* * * * *